(12) United States Patent
DeLay

(10) Patent No.: US 11,353,160 B2
(45) Date of Patent: Jun. 7, 2022

(54) PRESSURE VESSEL

(71) Applicant: Hanwha Cimarron LLC, Huntsville, AL (US)

(72) Inventor: Thomas K. DeLay, Huntsville, AL (US)

(73) Assignee: HANWHA CIMARRON LLC, Huntsville, AL (US)

(*) Notice: Subject to any disclaimer, the term of this patent is extended or adjusted under 35 U.S.C. 154(b) by 0 days.

(21) Appl. No.: 14/525,645

(22) Filed: Oct. 28, 2014

(65) Prior Publication Data
US 2015/0240993 A1 Aug. 27, 2015

Related U.S. Application Data

(60) Provisional application No. 61/945,220, filed on Feb. 27, 2014.

(51) Int. Cl.
*F17C 1/00* (2006.01)
*F17C 1/16* (2006.01)
(Continued)

(52) U.S. Cl.
CPC .................. *F17C 1/06* (2013.01); *F17C 1/16* (2013.01); *F17C 2201/0109* (2013.01); (Continued)

(58) Field of Classification Search
CPC ..... B65D 90/029; B29C 53/602; B29C 66/71; F17C 1/16; F17C 13/00; F17C 1/06; F17C 2201/0109; F17C 2201/0128; F17C 2201/0142; F17C 2201/054; F17C 2221/012; F17C 2221/016; F17C 2221/017; F17C 2221/033; F17C 2221/035; F17C 2223/0123; F17C 2223/036; F17C 2270/0102; F17C 2270/0168; F17C 2270/0197; B01D 53/22; Y02E 60/32; Y10T 428/13
(Continued)

(56) References Cited

U.S. PATENT DOCUMENTS 2,744,043 A * 5/1956 Ramberg .................. F17C 1/16
156/155
3,073,475 A 1/1963 Fingerhut
(Continued)

FOREIGN PATENT DOCUMENTS

JP 1992249699 A 9/1992
JP 1996219387 A 8/1996
(Continued)

OTHER PUBLICATIONS

Toray Carbon Fibers America Inc. http://www.toraycfa.com/highstrength.html—Data Sheets for T700S, T1000G, M30S.*
(Continued)

*Primary Examiner* — Gideon R Weinerth
(74) *Attorney, Agent, or Firm* — Ryan J. Letson; Stephen H. Hall; Bradley Arant Boult Cummings LLP

(57) ABSTRACT

The present disclosure provides a pressure vessel 10 (sometimes known as a composite overwrapped pressure vessel or "COPV") comprising carbon fiber 20 (such as carbon fiber 20 filaments) wrapped around a tank liner 30.

13 Claims, 4 Drawing Sheets

(51) Int. Cl.
*F17C 1/06* (2006.01)
*B29C 53/00* (2006.01)

(52) U.S. Cl.
CPC ............... *F17C 2201/0128* (2013.01); *F17C 2201/0142* (2013.01); *F17C 2201/054* (2013.01); *F17C 2203/0604* (2013.01); *F17C 2203/066* (2013.01); *F17C 2203/067* (2013.01); *F17C 2203/0609* (2013.01); *F17C 2203/0619* (2013.01); *F17C 2203/0621* (2013.01); *F17C 2203/0624* (2013.01); *F17C 2203/0663* (2013.01); *F17C 2203/0665* (2013.01); *F17C 2203/0668* (2013.01); *F17C 2203/0697* (2013.01); *F17C 2205/013* (2013.01); *F17C 2205/0107* (2013.01); *F17C 2205/0305* (2013.01); *F17C 2209/2109* (2013.01); *F17C 2209/2163* (2013.01); *F17C 2209/227* (2013.01); *F17C 2209/232* (2013.01); *F17C 2209/234* (2013.01); *F17C 2221/012* (2013.01); *F17C 2221/016* (2013.01); *F17C 2221/017* (2013.01); *F17C 2221/033* (2013.01); *F17C 2221/035* (2013.01); *F17C 2223/0123* (2013.01); *F17C 2223/036* (2013.01); *F17C 2270/0102* (2013.01); *F17C 2270/0168* (2013.01); *F17C 2270/0197* (2013.01); *Y02E 60/32* (2013.01)

(58) Field of Classification Search
USPC .................................................. 220/586–590
See application file for complete search history.

(56) References Cited

U.S. PATENT DOCUMENTS

| | | | | |
|---|---|---|---|---|
| 3,083,864 | A * | 4/1963 | Young | B29D 22/003 220/590 |
| 3,207,352 | A * | 9/1965 | Reinhart, Jr. | B29C 53/602 220/589 |
| 3,334,780 | A * | 8/1967 | Ragettli | F17C 13/123 220/590 |
| 3,360,411 | A * | 12/1967 | Ponemon | B29C 53/56 156/175 |
| 3,508,677 | A | 4/1970 | Laibson et al. | |
| 3,866,792 | A * | 2/1975 | Minke | B29C 53/605 220/589 |
| 3,937,781 | A * | 2/1976 | Allen | B29C 70/342 264/314 |
| 4,004,706 | A * | 1/1977 | Guldenfels | B65D 90/02 220/586 |
| 4,504,530 | A * | 3/1985 | Bliley | B29C 70/342 220/590 |
| 4,588,622 | A * | 5/1986 | Sukarie | B29C 53/602 156/171 |
| 4,699,288 | A * | 10/1987 | Mohan | B29C 53/602 220/560.01 |
| 4,773,952 | A * | 9/1988 | Wesley, Jr. | B29C 53/602 156/191 |
| 4,982,856 | A * | 1/1991 | Stokes | B29C 65/02 220/567.3 |
| 5,025,943 | A * | 6/1991 | Forsman | B29C 53/602 220/589 |
| 5,150,812 | A * | 9/1992 | Adams | B32B 27/08 215/12.2 |
| 5,358,683 | A * | 10/1994 | Rhodes | B29C 49/20 264/515 |
| 5,547,533 | A * | 8/1996 | Berglund | B29C 65/5042 156/175 |
| 5,595,321 | A * | 1/1997 | Berglund | B29C 65/5042 220/565 |
| 5,655,299 | A * | 8/1997 | Lindahl | F24H 9/124 29/890.051 |
| 5,697,511 | A * | 12/1997 | Bampton | B23K 20/1265 220/4.12 |
| 6,145,693 | A * | 11/2000 | Berglund | B29C 53/602 220/589 |
| 6,364,197 | B1 * | 4/2002 | Oelgoetz | B23K 20/122 228/112.1 |
| 6,418,962 | B1 * | 7/2002 | Wozniak et al. | 137/266 |
| 6,460,721 | B2 * | 10/2002 | Bowen et al. | 220/586 |
| 7,032,769 | B2 * | 4/2006 | Iida | B29C 70/382 220/591 |
| 7,195,133 | B1 | 3/2007 | Cundiff et al. | |
| 7,287,663 | B2 * | 10/2007 | Vandal et al. | 220/586 |
| 7,641,949 | B2 * | 1/2010 | DeLay | B29C 53/602 428/35.5 |
| 7,743,940 | B2 | 6/2010 | Brunnhofer | |
| 7,803,241 | B2 | 9/2010 | Cundiff et al. | |
| 7,867,589 | B2 * | 1/2011 | DeLay | F17C 3/00 220/560.04 |
| 7,870,971 | B2 * | 1/2011 | Schlag | B29C 41/04 220/585 |
| 7,918,956 | B2 * | 4/2011 | Mehta | F17C 1/16 156/172 |
| 8,147,595 | B2 * | 4/2012 | Nagase et al. | 96/4 |
| 8,172,108 | B2 * | 5/2012 | Emori | F17C 1/06 220/586 |
| 8,297,468 | B1 * | 10/2012 | DeLay | 220/581 |
| 8,449,705 | B1 * | 5/2013 | Rufer | B29C 53/587 156/155 |
| 8,658,756 | B2 * | 2/2014 | Mazabraud et al. | 528/310 |
| 8,783,504 | B2 * | 7/2014 | Kleschinski | F17C 1/16 220/589 |
| 8,815,360 | B2 * | 8/2014 | Beckwith | B32B 27/304 428/36.7 |
| 8,940,121 | B2 * | 1/2015 | Hill | B29C 49/04 156/172 |
| 9,205,373 | B2 * | 12/2015 | Leavitt | F17C 1/16 |
| 9,446,898 | B2 * | 9/2016 | Aylward | B65D 90/12 |
| 11,015,761 | B1 * | 5/2021 | Villarreal | F17C 1/06 |
| 2002/0117781 | A1 * | 8/2002 | LeBreton | B29C 33/505 264/314 |
| 2002/0150746 | A1 * | 10/2002 | Ono | C08L 81/02 428/292.1 |
| 2002/0155232 | A1 | 10/2002 | DeLay | |
| 2003/0037860 | A1 * | 2/2003 | Hauber | 156/172 |
| 2004/0040969 | A1 * | 3/2004 | DeLay et al. | 220/586 |
| 2004/0149759 | A1 * | 8/2004 | Moser | F17C 1/10 220/581 |
| 2004/0168773 | A1 * | 9/2004 | Hauber | B29C 63/24 156/425 |
| 2005/0173430 | A1 | 8/2005 | Van Schepdael et al. | |
| 2005/0260373 | A1 * | 11/2005 | DeLay et al. | 428/36.4 |
| 2006/0054628 | A1 * | 3/2006 | Matsuoka | F17C 1/06 220/581 |
| 2007/0158343 | A1 * | 7/2007 | Shimada | F17C 1/14 220/4.14 |
| 2007/0246461 | A1 * | 10/2007 | Shimada | F17C 1/00 220/4.12 |
| 2007/0246475 | A1 * | 10/2007 | Mazabraud et al. | 220/590 |
| 2008/0274383 | A1 * | 11/2008 | Kanno | B23K 20/123 429/412 |
| 2009/0057319 | A1 * | 3/2009 | Schlag | F17C 1/06 220/586 |
| 2009/0266823 | A1 * | 10/2009 | Mazabraud | B29C 41/003 220/581 |
| 2010/0276434 | A1 * | 11/2010 | Berger | F17C 1/06 220/586 |
| 2011/0210127 | A1 | 9/2011 | Strack et al. | |
| 2012/0048865 | A1 * | 3/2012 | Eihusen | F17C 13/002 220/586 |
| 2013/0186597 | A1 | 7/2013 | Clark et al. | |
| 2013/0261246 | A1 * | 10/2013 | Ong | C01B 32/05 524/495 |
| 2013/0299505 | A1 * | 11/2013 | Otsubo | B29C 53/562 220/590 |
| 2013/0313266 | A1 * | 11/2013 | Andernach et al. | 220/590 |
| 2014/0008373 | A1 * | 1/2014 | Sharp | F17C 1/06 220/586 |

(56) References Cited

U.S. PATENT DOCUMENTS

| | | | |
|---|---|---|---|
| 2014/0014667 A1* | 1/2014 | Flammer | 220/590 |
| 2014/0117589 A1* | 5/2014 | Vanswijgenhoven | F17C 1/06 |
| | | | 264/503 |
| 2015/0014332 A1* | 1/2015 | Nishibu | F17C 1/02 |
| | | | 220/586 |
| 2015/0204483 A1* | 7/2015 | Kojima | F17C 1/16 |
| | | | 220/592.25 |
| 2015/0240993 A1* | 8/2015 | DeLay | F17C 1/06 |
| | | | 220/590 |
| 2015/0316207 A1* | 11/2015 | Laney | B05D 1/02 |
| | | | 220/581 |
| 2017/0268725 A1* | 9/2017 | Yeggy | B29C 45/14344 |
| 2017/0314188 A1* | 11/2017 | Komukai | D06M 11/74 |
| 2017/0336031 A1* | 11/2017 | Newhouse | F17C 1/16 |
| 2018/0259124 A1* | 9/2018 | Kondo | F17C 1/00 |
| 2018/0283609 A1* | 10/2018 | Teruhira | B29C 70/10 |
| 2018/0362734 A1* | 12/2018 | Takeyama | C08L 21/00 |
| 2019/0162365 A1* | 5/2019 | Chung | F17C 1/08 |
| 2020/0384719 A1* | 12/2020 | Benson | B32B 5/26 |
| 2021/0129662 A1* | 5/2021 | Beckner | F17C 13/002 |

FOREIGN PATENT DOCUMENTS

| | | |
|---|---|---|
| JP | 1997280496 A | 10/1997 |
| JP | 2000249294 A | 9/2000 |
| JP | 2004522104 A | 7/2004 |
| JP | 2004286201 A | 10/2004 |
| JP | 2006342895 A | 12/2006 |
| JP | 2007508229 A | 4/2007 |
| JP | 2009512138 A | 3/2009 |
| JP | 2009255399 A | 11/2009 |
| JP | 2010019315 A | 1/2010 |
| JP | 2011017379 A | 1/2011 |
| JP | 2012512056 A | 5/2012 |
| JP | 2013508622 A | 3/2013 |
| JP | 2013227997 A | 11/2013 |
| WO | 91/18239 A1 | 11/1991 |
| WO | 92/20954 A1 | 11/1992 |

OTHER PUBLICATIONS

Hexcel Carbon Fiber http://www.hexcel.com/—http://www.hexcel.com/resources/datasheets/carbon-fiber-data-sheets/im7.pdf.*

International Search Report and Written Opinion for International application No. PCT/US2015/017061.

Notice of Reasons for Rejection for application serial No. JP 2016-554623 dated Jan. 22, 2019.

Extended European Search Report for application serial No. EP 15754903.1 dated Jan. 18, 2018.

Official Communication issued by the European Patent Office for application serial No. EP 15754903.1 dated May 12, 2020.

Official Communication issued by the European Patent Office for application serial No. EP 15754903.1 dated Oct. 9, 2020.

Notice of Reasons for Rejection for application serial No. JP 2016-554623 dated Jul. 23, 2019.

Hexagon Lincoln; Titan; retrieved from http://www.hexagonlincoln.com/product-lines/titan; retrieved Oct. 28, 2014.

Hexagon Lincoln; Titan Specifications; retrieved from http://www.hexagonlincoln.com/product-lines/titan/titan-specifications/titan-specifications; retrieved Oct. 28, 2014.

* cited by examiner

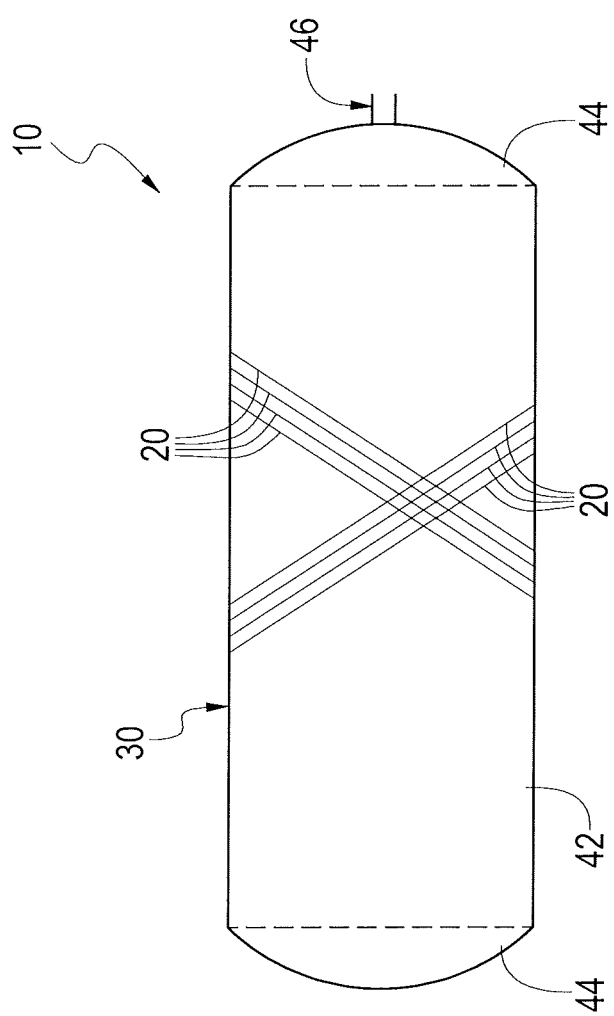
FIG. 1A
FIG. 1B
FIG. 1C

PRESSURE VESSEL

CROSS-REFERENCE TO RELATED APPLICATIONS

This application claims the benefit of, and priority to, pending U.S. Provisional Application No. 61/945,220 filed Feb. 27, 2014 titled "Pressure Vessel."

FIELD OF THE DISCLOSURE

The present disclosure pertains to vessels for the transport of pressurized gases and liquids. More specifically, in one embodiment, the present disclosure pertains to vessels for the transport and storage of compressed natural gas ("CNG"), propane, methane, alcohol, helium, hydrogen or argon.

BACKGROUND

The desire to supply more environmentally friendly (so called "green") fuels for automobiles and other uses has greatly increased the demand for pressure vessels that can both store and be used in the transport of the fuels. Once of the most promising fuels today is CNG, and the need for cost effective ways of producing pressure vessels for CNG vessels has arisen.

Generally, the two most expensive features of a CNG pressure vessel are the carbon fibers and the tank liners (around which the carbon fibers are wrapped). The cost of the carbon fibers is largely driven by the free market and thus pressure vessel manufacturers can do little to control or reduce the cost of the carbon fibers. Accordingly, reducing the cost of the tank liners is desirable.

The most common types of pressure vessels used are: type 3 (metal lined) and type 4 (plastic lined) vessels. There is also a new type 5 vessel being considered by industry. The type 5 vessel is considered to be all-composite (no metallic or non-metallic liner). It may also be considered to be a type 5 vessel if it has a very thin permeation barrier on the inside if it is also non-loadbearing. This disclosure can be applied to a type 4 and/or a type 5 vessel. The common type 3 vessel tank liner is aluminum, but there are also some tank liners produced by welded steel assemblies. The aluminum tank liner size limit is controlled by the diameter of available tube forgings. The diameter size usually stops around 18". There are new emerging markets for trucks and bulk storage systems that need 25" diameter tank liners or larger. This need for the larger diameters has been one of the reasons that more type 4 vessels are being developed. The manufacturing methods for the larger type 4 liners can be costly if there are frequent design changes because the molds and tooling are expensive. The new type 4 vessels however are lighter and cheaper than the aluminum liners for type 3 vessels.

The production of tank liners however, is not straight forward as it requires specialized tooling and other equipment, and the costs of the required equipment present a significant entry barrier in the industry.

The present disclosure provides a pressure vessel useful in the transport and storage of gases and liquids, such as CNG that comprises a tank liner with segments that can be bonded together. The pressure vessel of the present disclosure allows for modular manufacturing that is cost effective and readily adaptable to change, more robust end fittings and domes.

BRIEF DESCRIPTION OF THE DRAWINGS

To further provide the advantages and features of the present disclosure, a more particular description of the invention will be rendered by reference to specific embodiments thereof which are illustrated in the appended drawings. It is appreciated that these drawings are not to be considered limiting in scope. The invention will be described and explained with additional specificity and detail through the use of the accompanying drawings in which:

FIG. 1A shows one embodiment of carbon fiber 20 having been overwrapped onto a tank liner 30.

FIGS. 1B and 1C show various embodiments of the permeation barrier of the present disclosure.

DETAILED DESCRIPTION

Figure 2:
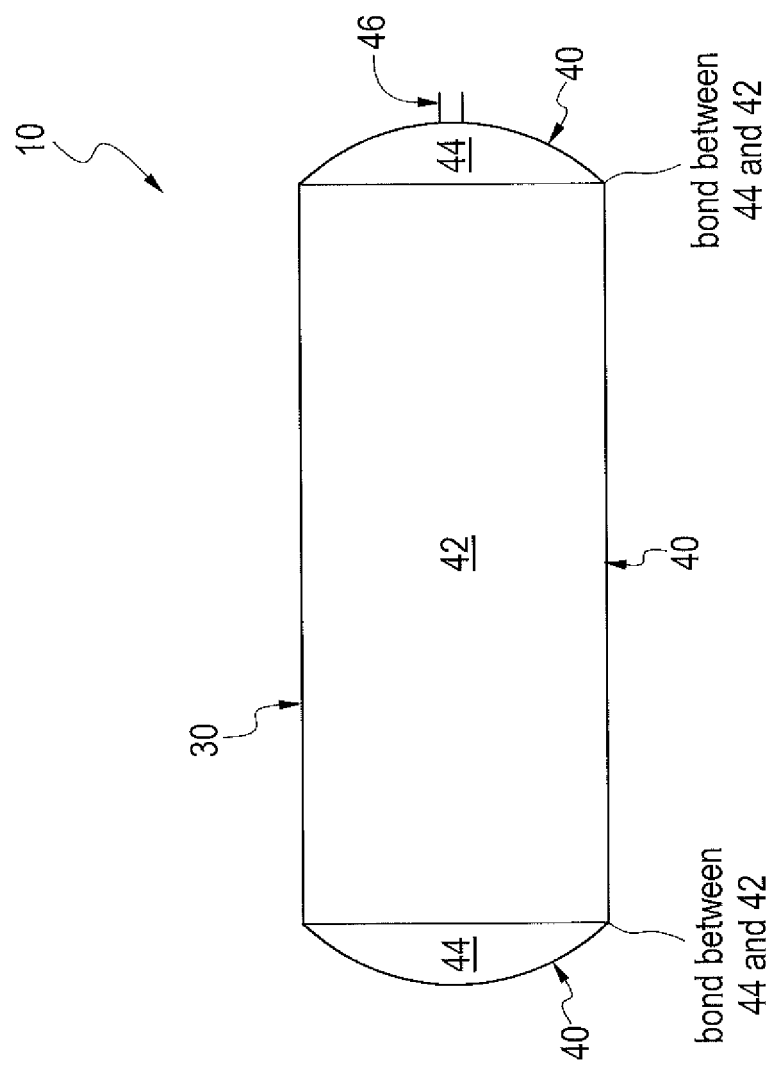
FIG. 2 shows one embodiment of a tank liner 30 disclosed herein.

The present disclosure provides a pressure vessel 10 (sometimes known as a composite overwrapped pressure vessel or "COPV") comprising fibers 20 (such as carbon fiber 20 filaments) wrapped around a tank liner 30. The fibers 20 can also be used with embedded layers of fabric or other textiles to enhance performance as needed as would be recognized by one of skill in the art.

Any fiber 20 known in the art can be used with the pressure vessel 10 disclosed herein. For example, typical carbon fiber 20 for pressure vessels 10 have a tensile strength about 700 kilo pounds per square inch (ksi) and a tensile modulus of about 33 million pounds per square inch (msi) or higher, so any material with similar characteristics may be used. Other fibers 20 overwraps include, but are not limited to, glass fiber, basalt fiber, jute twine, Zylon®, high-density polyethylene, polypropylene, polyethylene, nylon, Vectran® and high strength metal wire. In some embodiments, a carbon fiber 20 overwrap may also include an epoxy or a resin that acts to strengthen and harden the carbon fibers 20. The present disclosure is not limited to a pressure vessel 10 comprising a single type of fiber 20, accordingly, it is to be understood that the pressure vessel 10 may be wrapped (or overwrapped) with a plurality of different types of carbon fibers or other fibers 20, depending upon intended use and size of the pressure vessel 10. One example of a tank liner 30 having been overwrapped and showing some of the carbon fibers 20 overwrapped onto the tank liner 30 is shown in FIG. 1. The fibers 20 may be wrapped at a continuous "depth" around the tank liner 30, or certain segments of the tank liner 30 may be wrapped with thicker layers of fiber 20. For example, an area known to be subject to greater pressure may have more fibers 20 overwrapped than a section under less pressure. Alternatively, different types of fibers 20 may be used on different areas of the pressure vessel subject to different pressures. Additionally, layering patterns may be used in connection with the present disclosure, including without limitation, fibers 20 wound in helical layers, polar layers or hoop layers. Additionally, individual fibers 20 may be wound the same or differing angles relative to the tank liner depending upon the desired traits of the pressure vessel 10.

There are many suitable epoxies or resins that can be used in connection with the present disclosure. Some such resins are EPON® 828 and 862 and Dow 383, and there are a variety of different curing agents and additives that can be used to adjust the epoxy performance as needed. Additionally, the epoxy or resin can be impregnated onto the fibers 20 before winding or the fibers 20 can be "wet wound" where the epoxy or resin is added as the fibers 20 is wound about the tank liner 30. Epoxy is the common resin matrix, but others can be used such as urethanes, polyureas, epoxy vinyl ester, bismaleimide and benzoxazine.

The present disclosure also provides a pressure vessel 10 with a novel tank liner 30. The tank liner 30 may have a variety of shapes (thus imparting a similar shape on the pressure vessel 10) including spherical, cylindrical or conical. Of course, combinations of the aforementioned shapes are also within the scope of this disclosure. In one embodiment, the tank liner 30 acts as a mandrel/tooling that holds the metal end fittings (discussed below) in place and it provides the surface for the application of the permeation barrier. The composite mandrel tooling can rely on the permeation layer 50 (discussed below) to contain the gasses and the mandrel can be viewed as fly-away tooling.

Figure 3:
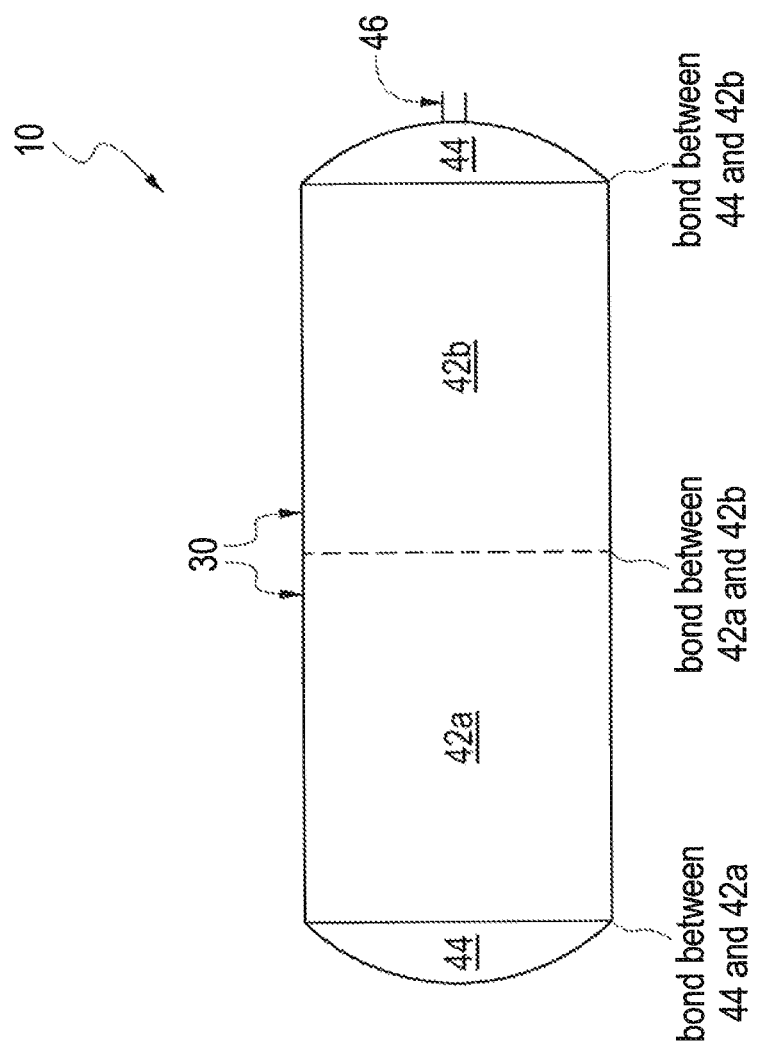
FIG. 3 shows an alternate embodiment of a tank liner 30 disclosed herein.

In one embodiment, the tank liner 30 comprises a plurality of segments 40 that are bonded together. In an alternate embodiment, the tank liner 30 is an integral structure comprising only one segment 40. The segments 40 can be molded or shaped into a number of configurations. For example, as shown in FIG. 2, the tank liner 30 may comprise a plurality of segments 40 wherein one segment 42 forms the cylindrical body of the tank liner and two other segments 44 form the ends or dome caps of the tank liner. Alternatively, as shown in FIG. 3, the cylindrical body of the tank liner 30 may be comprised of several segments 42a, 42b that are bonded together.

Depending upon the intended use of the pressure vessel 10, one or both end segments 44 may comprise an end fitting 46 (typically but not exclusively, a hole drilled in the apex of the tooling for the cap segments that is then fitted with a metal fitting that interfaces with the valve connection of a gas system) that is adapted to be connected to a valve or other mechanism useful for allowing the CNG to be vented from the pressure vessel 10. The metal end fitting can also be cast or wound in place with mandrel materials. Any end fitting known to those of skill in the art should be considered with the scope of this disclosure. Additionally, the type of end fitting may be varied depending upon the use of the pressure vessel 10.

The segments 40 comprising the tank liner 30 may comprise many different materials. In one embodiment, the tank liner 30 may be comprised of a single material while in other embodiments the tank liner 30 may be comprised of a plurality of materials (for example, the end segments 44 may be comprised of a different material than the segments 42 forming the body of the tank liner 30). The composition of the tank liner 30 may be varied depending upon the intended use of the pressure vessel 10. In one application, the segments 42 and 44 may comprise glass fiber reinforced plastics. In an alternate embodiment the segments 42 and 44 may comprise carbon fiber reinforced plastics. In alternate constructions, the segments 42 may comprise a glass fiber reinforced material while the end segments 44 are metallic. If weight is critical, the composite tooling mandrel can be made with a carbon fiber and an epoxy matrix resin, or other resins. The composite end segments 44 and metal end fittings 46 can also be outfitted with an-o-ring or sealant material in the metal and non-metallic interfaces. An all-metallic end fitting 46 and end segment 44 is especially useful in extremely high pressure situations as the end fittings 46 are not bonded to the end segment 44 but are rather an integral part of the end segment 44.

In the embodiments where the tank liner 30 comprises more than one segment 40, the segments must be bonded to one another. The segments 40 can have an overlapping joint allowing for a thin bond layer of adhesive to bond the segments 40 together.

The tank liner 30 may be overwrapped directly by the carbon fiber 20 or it may first be covered by a permeation barrier 50 as shown in FIGS. 1B and 1C. The permeation barrier 50 can be on the inside, outside or both side of the composite mandrel tooling depending on the application. The permeation barrier 50 may comprise a polymer such as polyurea or polyurethane or other flexible materials. The permeation barrier 50 can also contain various fillers and additives to enhance the gas permeation properties. In one embodiment the permeation barrier 50 may also comprise an additive such as nanoparticle that helps enhance its performance, such nanoparticles could include, but not be limited to, exfoliated clays or carbon nanotubes. This permeation barrier 50 typically does not add strength to the structure it helps to keep the contents of the pressure vessel 10 from leaking out. One of the main functions of the permeation barrier 50 is to contain the gasses within the tank liner 30. The permeation barrier 50 can have several layers of different materials that are used to reduce the diffusion of the gasses. Once the permeation barrier 50 is added over the tank liner 30, the carbon fiber 10 may be overwrapped using a traditional filament winding machine. In one embodiment, the permeation barrier 50 may be interior to the tank liner 30, then the tank liner 30 may be overwrapped with carbon fiber 10. In yet another alternate embodiment, there may be two (2) permeation barriers 50, one interior to the tank liner 30 and one exterior to the tank liner 30.

Figure 4:
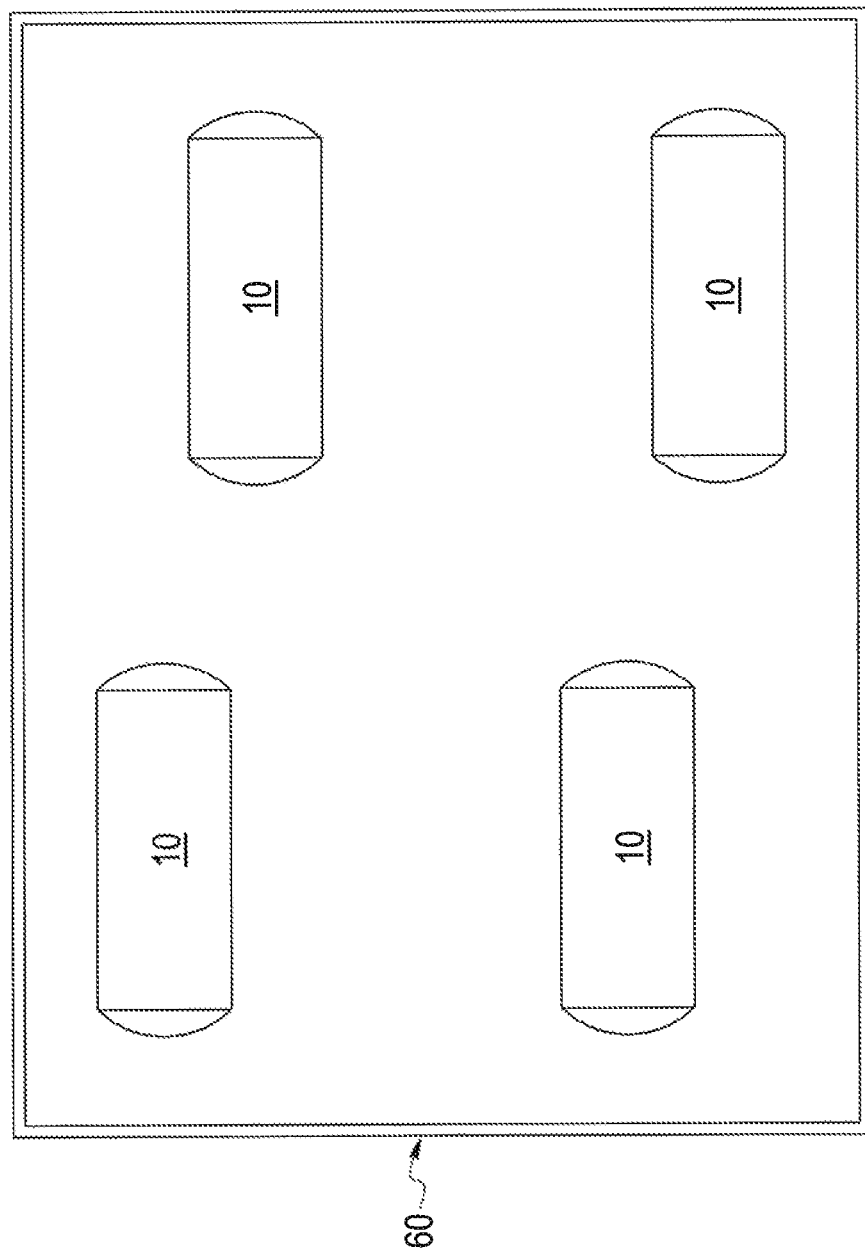
FIG. 4 shows one embodiment of a plurality of pressure vessels 10 being transported inside of a protective enclosure 60.

The pressure vessel 10 of the present disclosure may be used in a number of applications such as CNG powered automobiles, shipping CNG (by land or sea) or in rockets. Additionally, one or more of the pressure vessels 10 disclosed herein may be included within, or surrounded by, a protective enclosure 60 if the pressure vessels 10 are being used to ship CNG. For example, four pressure vessels 10 may be surrounded by a protective enclosure 60 as shown in FIG. 4.

Although particular embodiments of the present disclosure have been described, it is not intended that such references be construed as limitations upon the scope of this disclosure except as set forth in the claims.

I claim:

1. A pressure vessel comprising:
   a. an innermost, rigid, gas permeable tank liner consisting of glass fiber reinforced plastic, wherein the tank liner comprises a plurality of central segments and a plurality of cap segments and wherein a first cap segment comprises an integral end fitting;
   b. a middle, flexible, uniform, gas impermeable polymeric permeation barrier applied to the tank liner and wherein the permeation barrier comprises carbon nanotubes; and
   c. an outermost carbon fiber overwrap, wherein the carbon fiber overwrap has a variable thickness over different areas of the permeation barrier.

2. The pressure vessel of claim 1 wherein the polymeric material is selected from the group consisting of polyurethane and polyurea.

3. The pressure vessel of claim 2 wherein the tank liner is an integral structure.

4. The pressure vessel of claim 2 wherein the tank liner comprises a plurality of central segments and cap segments.

5. The pressure vessel of claim 4 wherein the cap segments are bonded to the central segments.

6. A pressure vessel comprising:
   a. an innermost, rigid gas permeable mandrel substrate consisting essentially of glass fiber reinforced plastic, wherein the gas permeable tank liner comprises a plurality of central segments and a plurality of cap segments and wherein a first cap segment comprises an integral end fitting;
   b. an outermost discrete carbon fiber overwrap, wherein the carbon fiber overwrap has a variable thickness over different areas of the tank liner; and
   c. a middle gas impermeable polymeric permeation barrier, wherein said barrier is located between the gas permeable mandrel substrate and the carbon fiber overwrap.

7. The pressure vessel of claim 6 wherein the gas permeable mandrel substrate is an integral structure.

8. The pressure vessel of claim 6 wherein the cap segments are bonded to the central segments.

9. The pressure vessel of claim 6 wherein the polymeric permeation barrier is flexible, and non-loadbearing.

10. The pressure vessel of claim 9, wherein the polymeric permeation barrier is a uniform, single layer.

11. The pressure vessel of claim 10 wherein the polymeric permeation barrier is selected from the group consisting of polyurethane and polyurea.

12. The pressure vessel of claim 6, wherein the integral end fitting comprises a metal.

13. A pressure vessel comprising:
   a. an innermost, rigid gas permeable mandrel substrate comprising a plurality of segments bonded together, said segments comprising a body, a first dome cap, and a second dome cap, wherein the mandrel substrate is uniform in composition and comprises a non-polymeric material, wherein the gas permeable tank liner comprises a plurality of central segments and a plurality of cap segments and wherein a first cap segment comprises an integral end fitting;
   b. a middle, non-loadbearing, uniform, flexible, gas impermeable polymeric permeation barrier covering the gas permeable mandrel substrate; and
   c. an outermost fiber overwrap covering the gas impermeable permeation barrier.

* * * * *